US009074551B2

(12) United States Patent
Yun et al.

(10) Patent No.: US 9,074,551 B2
(45) Date of Patent: Jul. 7, 2015

(54) METHOD AND APPARATUS FOR ENGINE OPERATION IN HOMOGENEOUS CHARGE COMPRESSION IGNITION AND SPARK IGNITION

(75) Inventors: Hanho Yun, Oakland Township, MI (US); Nicole Wermuth, Munich (DE); Paul M. Najt, Bloomfield Hills, MI (US); Jun-Mo Kang, Ann Arbor, MI (US); Barry L. Brown, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 957 days.

(21) Appl. No.: 13/181,925

(22) Filed: Jul. 13, 2011

(65) Prior Publication Data

US 2013/0018565 A1    Jan. 17, 2013

(51) Int. Cl.
| | | |
|---|---|---|
| *F02D 28/00* | (2006.01) | |
| *F01L 3/00* | (2006.01) | |
| *F02D 41/30* | (2006.01) | |
| *F02D 13/02* | (2006.01) | |
| *F02D 41/00* | (2006.01) | |

(52) U.S. Cl.
CPC .......... *F02D 41/3035* (2013.01); *Y02T 10/128* (2013.01); *F02D 41/3064* (2013.01); *F02D 41/307* (2013.01); *F02D 13/0261* (2013.01); *F02D 13/0265* (2013.01); *F02D 2041/001* (2013.01)

(58) Field of Classification Search
CPC ......... Y02T 10/18; Y02T 10/128; F02B 1/12; F02B 1/14; F02D 13/02; F02D 13/0203; F02D 13/207; F02D 13/0211; F02D 13/0261; F02D 13/0265; F02D 41/3035; F02D 2041/001; F02D 2013/00; F02D 2013/02; F02D 2013/0296
USPC ...... 123/90.11, 90.15–90.18, 295, 305, 27 R, 123/345–348, 568.14; 701/101–103
See application file for complete search history.

(56) References Cited

U.S. PATENT DOCUMENTS

| | | | |
|---|---|---|---|
| 5,357,915 A * | 10/1994 | Yamamoto et al. | 123/90.16 |
| 5,450,824 A * | 9/1995 | Yamane et al. | 123/90.15 |
| 6,105,550 A * | 8/2000 | Nieberding | 123/294 |
| 6,336,436 B1 * | 1/2002 | Miyakubo et al. | 123/295 |
| 6,338,245 B1 * | 1/2002 | Shimoda et al. | 60/285 |
| 6,386,177 B2 * | 5/2002 | Urushihara et al. | 123/299 |
| 6,425,367 B1 * | 7/2002 | Hiraya et al. | 123/299 |
| 6,644,019 B2 * | 11/2003 | Morikawa et al. | 60/285 |
| 6,739,295 B1 * | 5/2004 | Yamaoka et al. | 123/90.15 |
| 6,772,585 B2 * | 8/2004 | Iihoshi et al. | 60/277 |
| 6,932,062 B2 * | 8/2005 | Kuzuyama et al. | 123/568.13 |
| 6,957,640 B1 * | 10/2005 | Liu et al. | 123/305 |
| 7,080,613 B2 * | 7/2006 | Kuo et al. | 123/64 |
| 7,121,255 B2 * | 10/2006 | Liu et al. | 123/305 |

(Continued)

FOREIGN PATENT DOCUMENTS

| | | | |
|---|---|---|---|
| JP | 2007205181 A | * | 8/2007 |
| JP | 2009243295 A | * | 10/2009 |

*Primary Examiner* — Mahmoud Gimie
*Assistant Examiner* — John Zaleskas

(57) ABSTRACT

A method to control an internal combustion engine includes controlling the engine in a homogeneous charge compression ignition mode and depending upon the operating range of the engine operating both intake and exhaust valves with one of a high-lift profile or a low lift profile or the exhaust valves with a low-lift profile and the intake valves with a high-lift profile.

18 Claims, 5 Drawing Sheets

(56) References Cited

U.S. PATENT DOCUMENTS

| | | | |
|---|---|---|---|
| 7,213,566 B1* | 5/2007 | Jankovic | 123/302 |
| 7,412,967 B2* | 8/2008 | Kumano et al. | 123/435 |
| 7,415,963 B2* | 8/2008 | Chmela et al. | 123/299 |
| 7,516,731 B2* | 4/2009 | Yamaoka et al. | 123/295 |
| 2002/0139358 A1* | 10/2002 | Ma | 123/679 |
| 2002/0195078 A1* | 12/2002 | Hasegawa et al. | 123/294 |
| 2003/0226528 A1* | 12/2003 | Yamaoka et al. | 123/90.15 |
| 2004/0016425 A1* | 1/2004 | Ma | 123/676 |
| 2004/0079322 A1* | 4/2004 | Shiraishi et al. | 123/295 |
| 2004/0194746 A1* | 10/2004 | Yamaoka et al. | 123/90.15 |
| 2004/0244766 A1* | 12/2004 | Fujieda et al. | 123/299 |
| 2005/0235952 A1* | 10/2005 | Kuzuyama et al. | 123/305 |
| 2006/0016422 A1* | 1/2006 | Kuo et al. | 123/299 |
| 2006/0142926 A1* | 6/2006 | Yasui et al. | 701/111 |
| 2006/0144356 A1* | 7/2006 | Sellnau et al. | 123/90.16 |
| 2006/0150952 A1* | 7/2006 | Yang et al. | 123/432 |
| 2006/0196466 A1* | 9/2006 | Kuo et al. | 123/295 |
| 2006/0201489 A1* | 9/2006 | Brachert et al. | 123/568.14 |
| 2006/0225673 A1* | 10/2006 | Linderyd et al. | 123/27 R |
| 2006/0225704 A1* | 10/2006 | Linderyd et al. | 123/435 |
| 2006/0243241 A1* | 11/2006 | Kuo et al. | 123/295 |
| 2006/0288966 A1* | 12/2006 | Yang | 123/27 R |
| 2007/0144480 A1* | 6/2007 | Herweg et al. | 123/295 |
| 2007/0215106 A1* | 9/2007 | Petridis et al. | 123/347 |
| 2008/0035083 A1* | 2/2008 | Inomoto et al. | 123/90.15 |
| 2008/0047509 A1* | 2/2008 | Sellnau et al. | 123/90.15 |
| 2008/0066713 A1* | 3/2008 | Megli et al. | 123/295 |
| 2008/0162020 A1* | 7/2008 | Itoga et al. | 701/108 |
| 2008/0178836 A1* | 7/2008 | Yamashita et al. | 123/295 |
| 2008/0271436 A1* | 11/2008 | Najt et al. | 60/285 |
| 2008/0283006 A1* | 11/2008 | Sutherland et al. | 123/90.15 |
| 2008/0302319 A1* | 12/2008 | Kang et al. | 123/90.15 |
| 2009/0048760 A1* | 2/2009 | Chen et al. | 701/103 |
| 2009/0048761 A1* | 2/2009 | Kang et al. | 701/103 |
| 2009/0064950 A1* | 3/2009 | Rayl | 123/90.15 |
| 2009/0064951 A1* | 3/2009 | Rayl | 123/90.15 |
| 2009/0070006 A1* | 3/2009 | Rayl | 701/103 |
| 2009/0070015 A1* | 3/2009 | Rayl | 701/105 |
| 2009/0070016 A1* | 3/2009 | Rayl | 701/105 |
| 2009/0084333 A1* | 4/2009 | Cleary et al. | 123/90.17 |
| 2009/0095250 A1* | 4/2009 | Kuzuyama | 123/27 R |
| 2009/0099751 A1* | 4/2009 | Kuzuyama | 701/102 |
| 2009/0099816 A1* | 4/2009 | Kuzuyama | 702/183 |
| 2009/0248271 A1* | 10/2009 | Kuzuyama et al. | 701/103 |
| 2009/0312936 A1* | 12/2009 | Kakuya et al. | 701/103 |
| 2010/0043745 A1* | 2/2010 | Kuzuyama | 123/27 R |
| 2010/0145594 A1* | 6/2010 | Wermuth et al. | 701/102 |
| 2010/0236237 A1* | 9/2010 | Spiegel et al. | 60/602 |
| 2010/0236238 A1* | 9/2010 | Spiegel et al. | 60/602 |
| 2010/0242900 A1* | 9/2010 | Hitomi et al. | 123/299 |
| 2010/0242901 A1* | 9/2010 | Seto et al. | 123/299 |
| 2010/0269771 A1* | 10/2010 | Wermuth et al. | 123/90.16 |
| 2010/0312455 A1* | 12/2010 | Yamashita et al. | 701/103 |
| 2011/0108001 A1* | 5/2011 | Lee et al. | 123/305 |
| 2011/0168130 A1* | 7/2011 | Kang et al. | 123/295 |
| 2011/0283971 A1* | 11/2011 | Wermuth et al. | 123/406.11 |
| 2011/0283972 A1* | 11/2011 | Wermuth et al. | 123/406.12 |

* cited by examiner

METHOD AND APPARATUS FOR ENGINE OPERATION IN HOMOGENEOUS CHARGE COMPRESSION IGNITION AND SPARK IGNITION

TECHNICAL FIELD

This disclosure is related to internal combustion engine control.

BACKGROUND

The statements in this section merely provide background information related to the present disclosure. Accordingly, such statements are not intended to constitute an admission of prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous SI combustion mode and a stratified-charge SI combustion mode. SI engines can be configured to operate in a homogeneous-charge compression-ignition (HCCI) combustion mode, also referred to as controlled auto-ignition combustion, under predetermined speed/load operating conditions. The HCCI combustion mode includes a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich zones that form smoke and particulate emissions.

Engine airflow is controlled by selectively adjusting position of the throttle valve and controlling opening and closing of intake valves and exhaust valves. On engine systems so equipped, opening and closing of the intake valves and exhaust valves may be adjusted using a variable valve actuation system that includes variable cam phasing and a selectable multi-step valve lift, e.g., multiple-step cam lobes which provide two or more valve lift positions. In contrast to the throttle position change, the change in valve position of the multi-step valve lift mechanism is a discrete change, and not continuous.

When an engine operates in a HCCI combustion mode, the engine operates at a lean or stoichiometric air/fuel ratio operation with the throttle wide open to minimize engine pumping losses. When the engine operates in the SI combustion mode, the engine operates in stoichiometric air/fuel ratio, with the throttle valve controlled over a range of positions from 0% to 100% of the wide-open position to control intake airflow to achieve the stoichiometric air/fuel ratio.

In an engine configured to operate in SI and HCCI combustion modes, transitioning between combustion modes can be complex. The engine control module must coordinate actuations of multiple devices in order to provide a desired air/fuel ratio for the different modes. During a transition between a HCCI combustion mode and SI combustion mode, valve lift switching occurs nearly instantaneously, while adjustments to cam phasers and pressures in the manifold have slower dynamics. Until the desired air/fuel ratio is achieved, incomplete combustion and misfire can occur, leading to torque disturbances.

SUMMARY

A method to control an internal combustion engine includes controlling the engine in a homogeneous charge compression ignition mode. When the engine is operating within a low operating range, the engine is controlled with a low-lift valve strategy, when the engine is operating within a high operating range the engine is controlled with a high-lift valve strategy, and when the engine is operating within an intermediate operating range between the low operating range and the high operating range the engine is controlled with a mixed-lift valve strategy. The low-lift valve strategy includes a low-lift profile for an exhaust valve and an intake valve, and negative overlap of the intake and exhaust valves. The high-lift valve strategy includes a high-lift profile for the exhaust valve and the intake valve, and positive overlap of the intake and exhaust valves. The mixed-lift valve strategy includes the low-lift profile for the exhaust valve, and the high-lift profile for the intake valve.

BRIEF DESCRIPTION OF THE DRAWINGS

One or more embodiments will now be described, by way of example, with reference to the accompanying drawings, in which:

FIGS. 2-1, 2-2, and 2-3 illustrate exemplary exhaust and intake valve timing schemes operating in HCCI combustion during low, intermediate, and high operating ranges, respectively, in accordance with the present disclosure;

FIG. 3 illustrates net specific fuel consumption plotted against NMEP when operating the exemplary engine in the low, intermediate, and high operating ranges, in accordance with the present disclosure;

DETAILED DESCRIPTION

Figure 1:
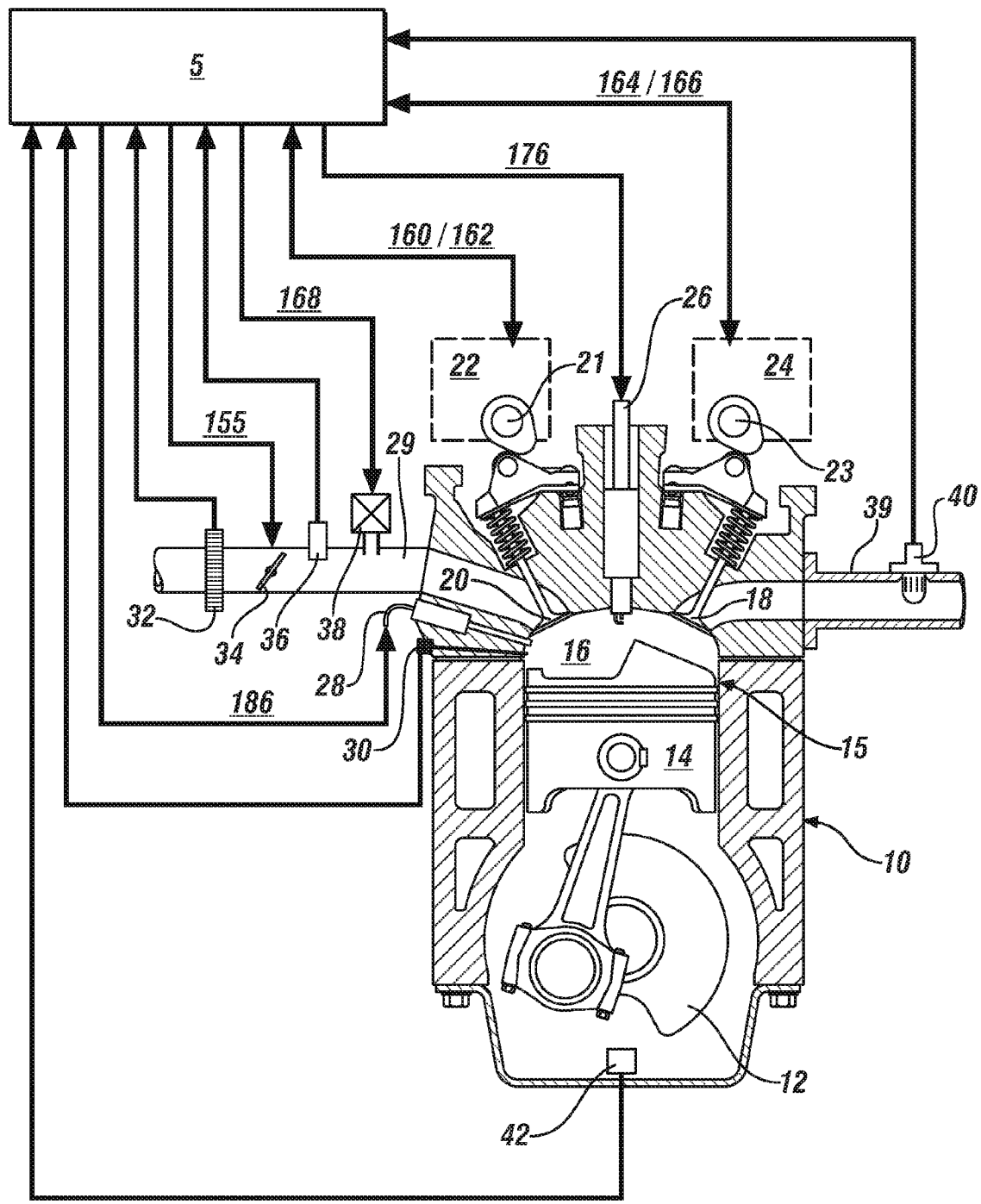
FIG. 1 is a section view of an internal combustion engine and a schematic drawing of an accompanying control module, in accordance with the present disclosure.

Referring now to the drawings, wherein the showings are for the purpose of illustrating certain exemplary embodiments only and not for the purpose of limiting the same, FIG. 1 is a section view of an internal combustion engine 10 and a schematic drawing of an accompanying control module 5 that have been constructed in accordance with an embodiment of this disclosure. The engine 10 is selectively operative in a plurality of combustion modes, including a HCCI combustion mode and a homogeneous spark-ignition (SI) combustion mode. The engine 10 is selectively operative at a stoichiometric air/fuel ratio and at an air/fuel ratio that is primarily lean of stoichiometry. The disclosure can be applied to various internal combustion engine systems and combustion cycles.

The exemplary engine 10 includes a multi-cylinder direct-injection four-stroke internal combustion engine having reciprocating pistons 14 slidably movable in cylinders 15. The pistons 14 are slidable between a top dead center (TDC) upper most position and a bottom dead center (BDC) lower most position which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow and intake air temperature. A throttle valve 34 preferably includes an electronically controlled device that is used to control airflow to the engine 10 in response to a control signal 155 from the control module 5. A pressure sensor 36 in the intake manifold 29 is configured to monitor manifold absolute pressure and barometric pressure. An external flow passage recirculates exhaust gases from an exhaust manifold 39 to the intake manifold 29, having a flow control valve referred to as an exhaust gas recirculation (EGR) valve 38. The control module 5 is operative to control mass flow of exhaust gas to the intake manifold 29 by controlling opening of the EGR valve 38 through a control signal 168.

Airflow from the intake manifold 29 into the combustion chamber 16 is controlled by one or more intake valve(s) 20. Exhaust flow out of the combustion chamber 16 is controlled by one or more exhaust valve(s) 18 to the exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift (VLC) of the intake valve(s) 20 and variably adjust and control phasing (VCP) of the intake camshaft 21 for each cylinder 15 in response to control signals 160 and 162, respectively, from the control module 5. In one embodiment, the VLC comprises a two step valve lift control. The exhaust VCP/VLC device 24 preferably includes a controllable mechanism operative to variably switch and control valve lift (VLC) of the exhaust valve(s) 18 and variably adjust and control phasing (VCP) of the exhaust camshaft 23 for each cylinder 15 in response to control signals 164 and 166, respectively, from the control module 5.

The intake and exhaust VCP/VLC devices 22 and 24 each preferably includes a controllable two-step VLC mechanism operative to control maximum valve lift, or opening, of the intake and exhaust valve(s) 20 and 18, respectively, to one of two discrete steps. The two discrete steps correspond to a low-lift profile with maximum valve open position (about 4-6 mm in one embodiment) preferably for low speed, low load operation, and a high-lift profile with maximum valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting phasing refers to shifting opening/closing times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 has a fuel injection system, including a plurality of high-pressure fuel injectors 28 each configured to directly inject a mass of fuel into one of the combustion chambers 16 in response to a control signal 186 from the control module 5. The fuel injectors 28 are supplied pressurized fuel from a fuel distribution system. The engine 10 includes a spark-ignition system by which spark energy can be provided to a spark plug 26 for igniting or assisting in igniting cylinder charges in each of the combustion chambers 16 in response to a control signal 176 from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 has a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 to determine combustion phasing, i.e., timing of combustion pressure relative to the crank angle of the crankshaft 12 for each cylinder 15 for each combustion cycle. However, combustion phasing may also be determined by similar methods as may be known by those skilled in the art. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, exhaust gas fractions, and non-intrusive cylinder pressure sensors.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation.

Control module 5 monitors inputs from the aforementioned sensors to determine states of engine parameters. The control module 5 is configured to receive input signals from an operator (e.g., via an accelerator pedal and a brake pedal) to determine an operator torque request. The control module 5 monitors the sensors indicating the engine speed and intake air temperature, and coolant temperature and other ambient conditions.

The control module 5 executes routines stored therein to control the aforementioned actuators to form the cylinder charge, including controlling throttle position, spark-ignition timing, fuel injection mass and timing, EGR valve position to control flow of recirculated exhaust gases, and intake or exhaust valve timing and phasing on engines so equipped. Valve timing and phasing can include negative valve overlap (NVO) and lift of exhaust valve reopening (in an exhaust re-breathing strategy) in one embodiment. In another embodiment, the control module 5 can operate valve timing and phasing in a positive valve overlap (PVO) strategy with a late intake valve closing strategy (LIVC). The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

During combustion mode transitions, the engine 10 is controlled to operate at a preferred air/fuel ratio and the intake airflow is controlled to achieve the preferred air/fuel ratio. This includes estimating a cylinder air charge based upon engine operation in the selected combustion mode. An exemplary preferred air/fuel ratio can be a stoichiometric air/fuel ratio. The throttle valve 34 and intake and exhaust VCP/VLC devices 22, 24 are controlled to achieve an intake air flowrate based upon the estimated cylinder air charge, including during a transition between the SI and HCCI combustion modes. Airflow is controlled by adjusting the throttle valve 34 and the intake and exhaust VCP/VLC devices 22 and 24 to control the opening timing and profiles of the intake and exhaust valve(s) 20 and 18. Operations in the two combustion modes requires different settings for the intake and exhaust VCP/VLC devices 22 and 24 in terms of valve timing and profiles of the intake and exhaust valve(s) 20 and 18 and the throttle valve 34 for throttle position.

The control module 5 converts a series of desired engine parameters to control states for actuators associated with the engine parameters as outputs. Exemplary desired engine parameters include: desired intake oxygen ($O_2$), desired air/fuel ratio (AFR), fuel mass, intake manifold air pressure (MAP), combustion phasing (CA50), and intake air flow (MAF). The control of the desired $O_2$ occurs by controlling the EGR valve 38 position, which the intake airflow. If the EGR valve 38 becomes more open, more EGR gas is able to enter the intake airflow restricting the amount of O2 available for combustion.

The desired AFR is controlled by modifying the MAF which can be controlled by adjusting valve timing that can be operated in NVO for HCCI combustion and LIVC for SI combustion. By maintaining the intake valve 20 open for longer periods of time during the intake stroke, more air is available for the combustion charge. A fuel mass parameter may then be determined to achieve the desired AFR. MAP is controlled by operating the throttle valve 34. Opening the throttle valve 34 increases the amount of air pressure within the intake manifold, wherein wide open throttle (WOT) is the most open position. Reducing the opening of the throttle valve 34 decreases the intake manifold pressure. The desired CA50 is controlled through injection timing and spark timing when in HCCI combustion mode and is controlled through spark timing when in SI combustion mode. Control of CA50 allows for a proper engine load to be achieved based on current operating conditions.

Certain engine actuators are known to have a fast dynamic response (known as fast engine actuators), and can adjust to a new commanded output within a single engine cycle or cylinder event. The fast engine actuators include, e.g., the fuel injectors 28, the spark-ignition system that provides ignition energy to the spark plug 26, and the VLC portion of the intake and exhaust VCP/VLC devices 22, 24. Other engine actuators are relatively slower in effecting a change in engine operation in response to a control signal (known as slow engine actuators), and take multiple engine cycles or cylinder events to adjust to a new commanded output due to component inertias, mechanical response times, and airflow lags. The slow engine actuators include, e.g., EGR valve position, throttle position, and valve phasing as controlled by the intake and exhaust VCP/VLC devices 22, 24. An intermediate valve operating mode or intermediate operating range may be used to smooth the transition during HCCI combustion and to SI combustion allowing the slow engine actuators time to react to the new operating conditions of SI combustion.

During engine operation in the SI combustion mode, the throttle valve 34 is controlled to regulate the manifold air pressure. The EGR valve 38 is controlled to regulate the amount of oxygen in the airstream. The engine 10 is controlled to a stoichiometric air/fuel ratio, and both the intake and exhaust valves 20 and 18 operated with high-lift profiles (i.e. high-lift valve strategy) with a positive valve overlap. The LIVC valve control scheme can be utilized wherein LIVC is operated with high intake manifold pressure. Combustion phasing can be further controlled by spark timing. The airflow is controlled primarily by intake cam phasing. Preferably, a fuel injection event is executed during the compression phase of an engine cycle, preferably substantially before TDC. Spark-ignition is preferably discharged at a predetermined time subsequent to the fuel injection when the cylinder contents are substantially homogeneous.

During engine operation in the HCCI combustion mode, the throttle valve 34 is substantially wide-open, with the engine 10 controlled at a lean or stoichiometric air/fuel ratio. The intake and exhaust valves 20 and 18 are both operated with low-lift profiles (i.e. low-lift valve strategy) and the intake and exhaust lift timing operate with NVO. Combustion phasing can be further controlled by fuel injection timing and spark timing. Substantially wide-open throttle can include operating fully un-throttled, or slightly throttled to create a vacuum in the intake manifold 29 to effect EGR flow. EGR flow controls the amount of oxygen available in the intake airstream. In one embodiment, in-cylinder EGR mass is controlled to a high dilution rate, e.g., greater than 40% of cylinder air charge. One or more fuel injection events can be executed during an engine cycle including at least one injection during a compression phase.

Operation in HCCI mode, wherein combustion occurs based upon compression of the charge to a point of substantially uniform combustion throughout the combustion chamber, is highly dependent upon conditions within the combustion chamber. If insufficient heat or pressure is present within the combustion chamber, the charge may fail to ignite or may misfire, resulting in unstable combustion or a drop in efficiency of combustion. If excessive heat or pressure is present within the combustion chamber, the charge may combust before the intended start of combustion, resulting in disorderly combustion or ringing in the cylinder.

Valve lift can be adjusted in order to control the heat and pressure present in the combustion chamber. At low engine loads and speeds or at an engine operating point in a low operating range, whereat lower heat and pressure is present in the combustion chamber, low-lift profiles for the exhaust and intake valves can be utilized. Such operation reduces the cool intake air drawn into the cylinder and increases potential to utilize NVO to compress the charge near TDC, thereby reducing potential for misfires and increasing combustion stability within the low operating range (i.e. lower engine loads and speeds). At higher engine loads and speeds or at a engine operating point in a high operating range, operation of the exhaust and intake valves with low-lift profiles can result in excessive heat or pressure to be present within the combustion chamber and the corresponding ringing in the cylinder. Extending operation of an engine in HCCI mode into this high operating range (i.e. higher engine loads and speeds) can be accomplished by operating the exhaust and intake valves with high-lift profiles. By operating both the exhaust valve and the intake valve with high-lift profiles, NVO is reduced or PVO is created, reducing compression at TDC, and additional cool intake air is drawn into the cylinder.

A high limit of operation for HCCI combustion with both exhaust and intake valves operated with a low-lift profile can be close to or below the low limit of operation for HCCI combustion with both exhaust and intake valves operated with a high-lift profile. As a result, operation in HCCI mode at the transition between low-lift and high-lift valve strategies (i.e. in a gap between or intermediate the low and high operating ranges) can include ringing or unstable combustion. Further, a transition from one profile for both of the exhaust and intake valves to the other profile for both valves requires a number of engine operating parameters to be adjusted. These engine operating parameters can take more than a single combustion cycle to change, resulting in a perceptible interruption to engine operation in the transition.

Operation of HCCI mode with both exhaust and intake valves operated with low-lift profiles can be extended by retarding combustion, for example, by retarding the start of fuel injection. However, retarding combustion is known to reduce combustion efficiency, resulting in decreased fuel efficiency.

A method to transition between operation of HCCI mode combustion in a low operating range with a low-lift valve strategy of both exhaust and intake valves at low-lift profiles and in a high operating range with a high-lift valve strategy of exhaust and intake valves at high-lift profiles includes operation in an intermediate operating range with a mixed-lift valve strategy of the exhaust valve at a low-lift profile and the intake valve at a high-lift profile. By controlling the exhaust and intake valves in this way, properties of an intermediate operating range between a low operating range wherein low-lift profiles are utilized and a high operating range wherein high-lift profiles are utilized can bridge a gap between the high operating range and the low operating range. Ringing from valves operated with low-lift profiles or unstable combustion from valves operated high-lift-profiles can be avoided, and the reduced efficiency associated with retarding combustion can also be avoided. Further, by transitioning the valves such that the exhaust valve is operated with a low-lift profile and the intake valve is operated with a high-lift profile, it will be appreciated that a transition to either the low operating range or the high operating range is facilitated in that only one of the exhaust or intake valves will need to transition, therefore reducing an impact of the transition to the perceptible operation of the engine.

The control module 5 transitions engine operation to the preferred combustion mode associated with the engine 10 to increase fuel efficiencies and combustion stability, reduce ringing, or decrease emissions. A change in an engine operating point can change the current operating range of the engine operating point. The control module 5 commands a change in the operation of the engine including valve lift settings based upon the current operating range of the engine operating point.

Figures 1, 2:
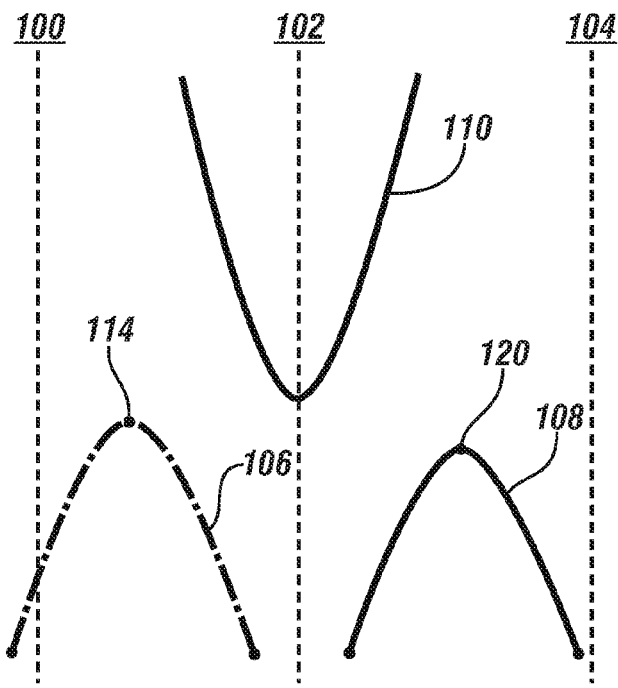
Figure 2:
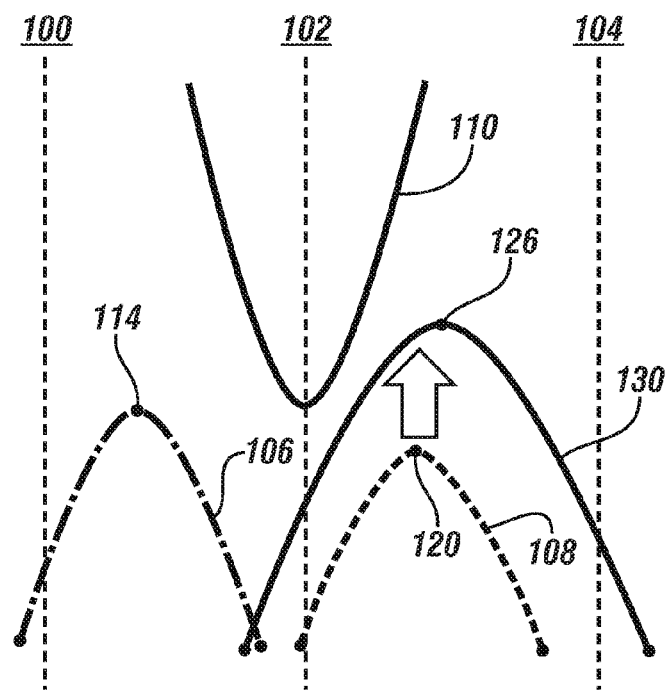
Figures 2, 3:
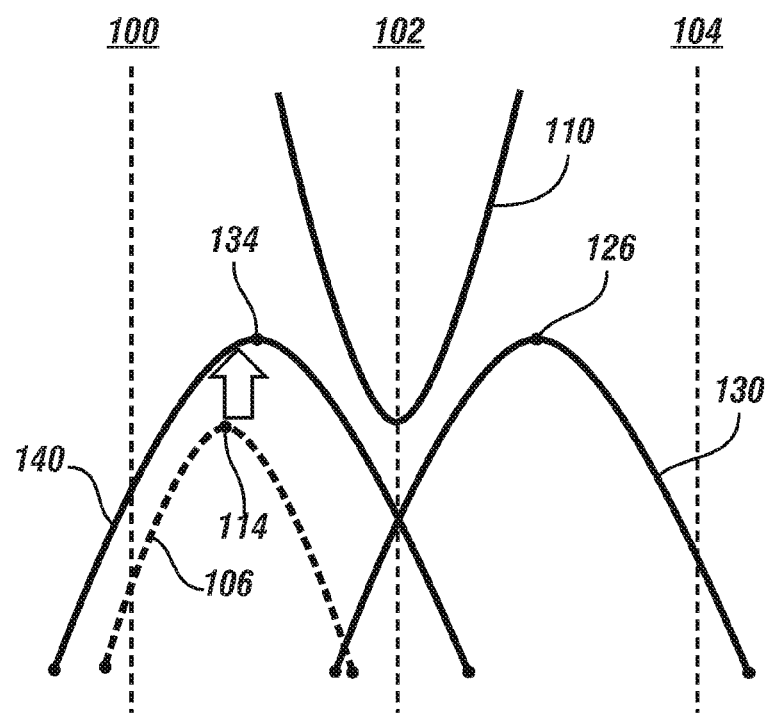
Figure 3:
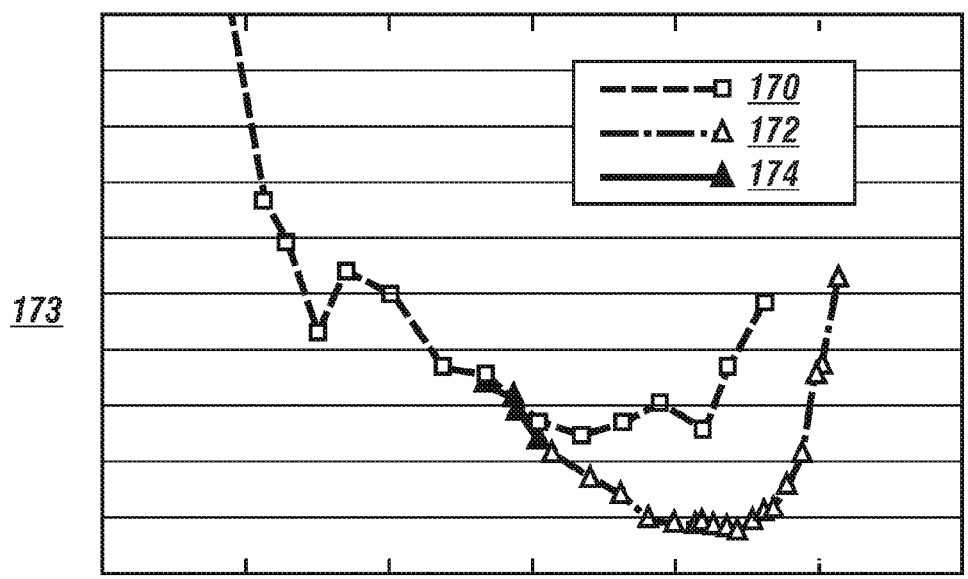

FIGS. 2-1, 2-2, and 2-3 are illustrations of exemplary exhaust and intake valve lift profiles operating in HCCI combustion during a low operating range, intermediate operating range, and high operating range, respectively. Like numerals represent the same item throughout the drawings. FIG. 2-1 is an illustration of exemplary low-lift exhaust and intake valve profiles, 106 and 108 respectively, with an engine operating point in the low operating range. The horizontal axis represents crank angle degrees through a combustion cycle. Curve 110 in an upper portion represents motion of the piston with the local minimum indicating the piston reaching TDC. Curves in the lower portion represent valve lift as further described below. Operation in the low operating range represents operation in HCCI combustion in a low-lift valve strategy of both exhaust and intake valves at low-lift profiles. The four strokes of a four stroke internal combustion are represented relative to areas of piston travel related to the extremes of piston travel, namely bottom dead center (BDC) and top dead center (TDC). BDC is depicted at line 100 wherein the area to the left of BDC 100 represents a power stroke and the area to the right of BDC 100 represents the exhaust stroke. TDC after the exhaust stroke is depicted at line 102 and the area to the right of TDC 100 represents the intake stroke. BDC after the intake stroke is depicted at line 104 and the area to the right of BDC 104 represents a compression stroke.

The exemplary exhaust valve travel 106 initially opens and increases to a predetermined lift 114 and closes during the exhaust stroke, i.e., right of BDC 100 and prior to TDC 102. The exemplary intake valve travel 108 initially opens, increasing to a predetermined lift 120 and closes during the intake stroke, i.e., left of BDC 104. The magnitude of valve lift is represented by the points 114 and 120 for the exhaust valve travel and intake valve travel 106, 108 respectively. The duration of each valve opening is represented by the distance between the opening points and closing points for the respective exhaust and intake valve travel 106, 108. The relationship between the exhaust valve closing and the opening of the intake valve indicates a valve overlap condition, in this case, NVO. It is understood that due to the VCP portion of the VCP/VLC system the amount of NVO is adjustable based on the engine operating parameters and may become larger or smaller than represented in this static reference.

FIG. 2-2 is an illustration of exemplary exhaust valve profile 106 and low-lift and intake valve high-lift profiles, 108 and 130 respectively, with an engine operating point in the intermediate operating range. The horizontal axis represents crank angle degrees through a combustion cycle. Curve 110 in an upper portion represents motion of the piston with the local minimum indicating the piston reaching TDC. Curves in the lower portion represent valve lift as further described below. Operation in the intermediate operating range represents operation in HCCI combustion mode in mixed-lift valve strategy of an exhaust valve low-lift profile and a intake valve high-lift profile. The four strokes of the four stroke internal combustion process can be shown, as above, with BDC between the power stroke and the exhaust stroke at line 100, TDC between the exhaust stroke and the intake stroke at line 102, and BDC between the intake stroke and the compression stroke at line 104.

The exhaust valve low-lift profile is represented by line 106, including predetermined lift 114, and exemplary intake valve high-lift profile is represented by line 130, including predetermined lift 126. For reference, intake valve low-lift profile is represented by dotted line 108, including predetermined lift 120, illustrating the changed valve lift from the valve operation described in FIG. 2-1. The change of the intake valve to the high-lift profile creates a longer duration that the valve is open, thereby affecting the overlap condition. In the exemplary valve lift profiles of FIG. 2-2, a small PVO condition is created. The valve overlap condition can be modulated based upon considerations known to one having ordinary skill in the art based upon changing profiles for either the exhaust valve or the intake valve.

FIG. 2-3 is an illustration of exemplary exhaust and intake valve profiles, 140 and 130 respectively, with an engine operating point in the high operating range. The horizontal axis represents crank angle degrees through a combustion cycle. Curve 110 in an upper portion represents motion of the piston with the local minimum indicating the piston reaching TDC. Curves in the lower portion represent valve lift as further described below. Operation in the high operating range represents operation in the HCCI combustion mode in a high-lift valve strategy of both exhaust and intake valves at high-lift profiles. The four strokes of the four stroke internal combustion process can be shown, as above, with BDC between the power stroke and the exhaust stroke at line 100, TDC between the exhaust stroke and the intake stroke at line 102, and BDC between the intake stroke and the compression stroke at line 104.

The intake valve high-lift profile is represented by line 130 and includes predetermined lift 126. The exhaust valve high-lift profile is represented by line 140 and includes predetermined lift 134. For reference, exhaust valve low-lift profile is represented by dotted line 106, including predetermined lift 114, illustrating the changed valve lift from the valve operation described in FIG. 2-2. A large amount of PVO occurs resulting in a PVO combustion mode that is associated with HCCI combustion in the high operating range.

When an operating point is determined to be above a high operating range threshold, defining an engine operating point limit above which HCCI combustion is not favorable, the control module 5 can command a transition from the HCCI combustion in the high operating range to SI combustion. Transition between HCCI combustion and SI combustion can be accomplished with reduced disruption to engine operation as a result of both modes utilizing high-lift exhaust and intake valve profiles.

Operation of HCCI combustion is limited based upon reduced stability or efficiency and ringing or audible combustion noise. First and second thresholds respectively defining boundaries between the low operating range, intermediate operating range, and high operating range can be selected or calibrated based upon engine operation, e.g., audible combustion noise and efficiency.

Operation of an engine in low, intermediate, and high operating ranges can be determined by monitoring an operating point of the engine as a monitored engine speed and a monitored engine load and comparing the operating point to thresholds defining the various operating ranges. A first threshold defining a boundary between the low and intermediate operating ranges can be plotted at as boundary in two-dimensional space defined by axes of engine speed and engine load. Similarly, a second threshold defining a boundary between the intermediate and high operating ranges can be plotted as a boundary in the same two-dimensional space. However, for ease of implementation, monitoring the operating point of the engine can be simplified to monitoring a load of the engine while the engine is within a given engine speed range or has an engine speed substantially equal to a selected calibrated speed and comparing the load of the engine to a first threshold load defining a boundary between the low and intermediate operating ranges and a second threshold load defining a boundary between the intermediate and high operating ranges to determine the operating range of the engine as low, intermediate, or high. Additionally, a high operating range threshold load can be utilized to transition from HCCI mode to SI mode. A number of threshold values can be available based upon different engine speed ranges, for example, made available through a look-up table. By simplifying the determination of the operating range based upon load in this way, the comparison of the threshold values to the monitored load value can be performed more quickly and with less computational load upon the control module.

The low, intermediate, and high operating ranges can be determined by engine load measured by net mean effective pressure (NMEP) rated in kPa. In one exemplary engine configuration, based upon testing of the exemplary configuration and balancing, the low operating range extends from an operating load range of 0 kPa to approximately 450 kPa, with a first threshold load of 450 kPa, the intermediate operating range extends from an operating load range of approximately 450 kPa to 600 kPa, with a second threshold load of 600 kPa, and the high operating range extends from the operating load range of approximately 600 kPa to 1000 kPa. Above 1000 kPa NMEP, a high operating range threshold load for the exemplary engine, operation of the engine transitions to SI combustion mode. It will be appreciated that these numbers can change for different engine configurations, fuel types, and operating ranges, and the particular values can be determined by calibration according to methods disclosed herein.

FIG. 3 is graphical data of net specific fuel consumption (NSFC) in g/kW-hr on the vertical axis 173 plotted against NMEP on the horizontal axis 175 when operating the exemplary engine in the low operating range 170, the high operating range 172, and the intermediate operating range 174. NSFC is a fuel consumption metric useful to express combustion efficiency, with low values indicating higher efficiency. As each specific engine has its own NSFC characteristics, the specific NSFC rating is not important however, the trend of each graph shows is representative of operational characteristics achievable. Each of the ranges 170, 172, and 174 exhibit lower NSFC values through particular ranges of load. Comparing the low operating range 170 and the high operating range 172, a gap between a value of 172 at a lowest load value and lagging efficiency of operating range 170 at that load value is evident. Values for operating range 174 at load values close to the lowest load value for operating range 172 illustrate an ability of operation in the intermediate operating range 174 to bridge the gap between the low operating range 170 and the high operating range 172. By switching between the low operating range 170, high operating range 172, and intermediate operating range 174 based upon load, operation along an optimized lowest NSFC, highest efficiency profile of values can be maintained.

Figure 4:
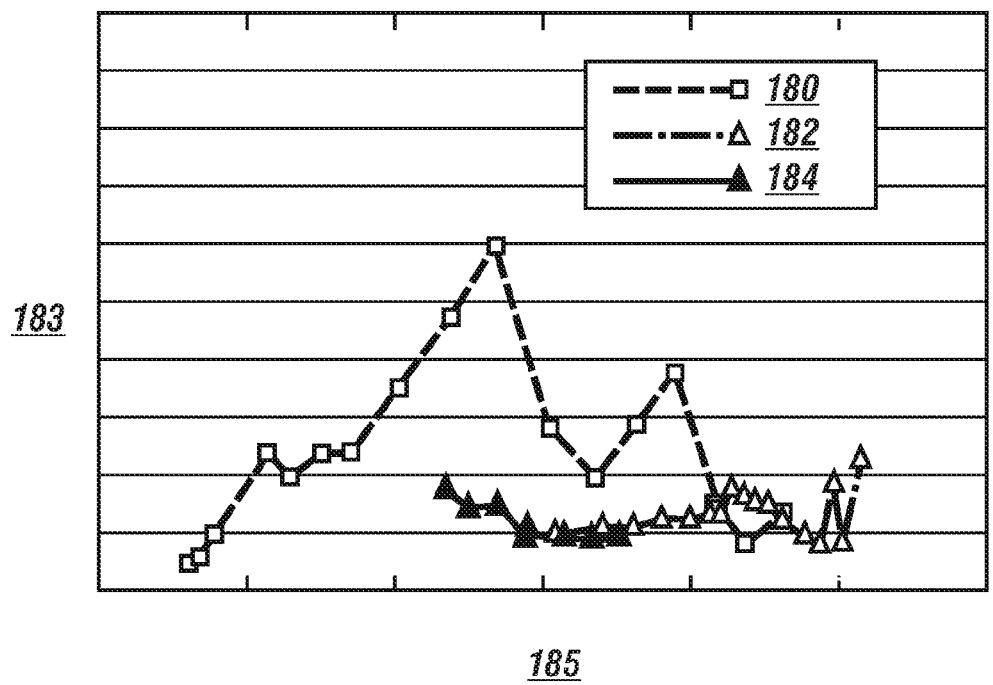
FIG. 4 illustrates a ringing index plotted against NMEP when operating the exemplary engine in the low, intermediate, and high operating ranges, in accordance with the present disclosure.

FIG. 4 is graphical data of a ringing index (RI) in MW/m$^2$ on the vertical axis 183 plotted against NMEP on the horizontal axis 185 when operating the exemplary engine in the low operating range 180, the high operating range 182, and the intermediate operating range 184. The RI is an indication of audible combustion noise level at various load values for each of operating ranges 180, 182, and 184. As each specific engine has its own RI characteristics, the specific RI rating is not important however, the trend of each graph shows is representative of operational characteristics achievable. Combustion in the low operating range 180 is illustrated starting from a low load value and a correspondingly low RI value. The RI increases to a peak value then decreases over the load range while generally returning a higher RI value than the intermediate operating range 184 and the high operating range 182. The intermediate operating range 184 begins prior to the peak RI of the low operating range 180 and extends into the high operating range 182 while maintaining a relatively consistent RI level. The high operating range 182 can begin during the intermediate operating range and extends to the end of the process where the RI remains in a narrow band until the RI level becomes inconsistent.

Selecting an operating range to utilize through the illustrated data points based upon achieving lower combustion noise levels, switching from the low operating range 180 to the intermediate operating range 184 at the lowest available load value of the intermediate operating range achieves a significant drop in combustion noise. Combining the data of FIGS. 3 and 4, the low, intermediate, and high operating ranges, embodied as first, second, and third operating range thresholds, can be calibrated to provide for the highest efficiency possible and reduced combustion noise. Alternatively, operation of the engine can be mapped over a range of engine load and speed values, providing a two dimensional calibrated map of the low, intermediate, and high operating ranges for use with both engine load and speed.

Figure 5:
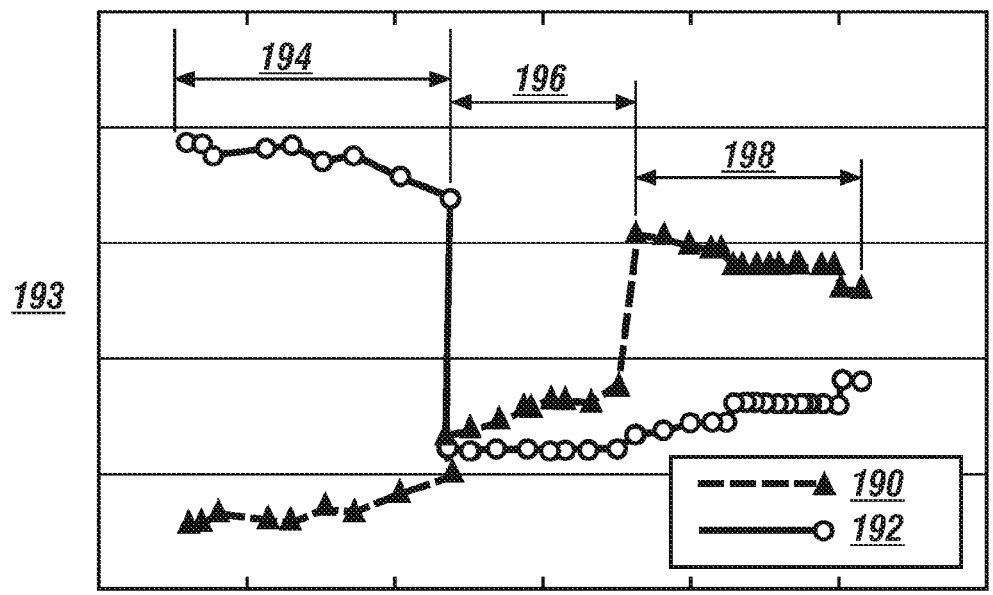
FIG. 5 illustrates valve timing plotted against NMEP for the intake valve opening and exhaust valve closing when operating the exemplary engine in the low, intermediate, and high operating ranges, in accordance with the present disclosure.

FIG. 5 is graphical data of valve timing (deg aTDC) on the vertical axis 193 plotted against NMEP on the horizontal axis 195 for the intake valve opening 192 and exhaust valve closing 190 when operating the exemplary engine in low operating range HCCI operation 194, intermediate operating range HCCI operation 196, and high operating range HCCI operation 198. NVO exists when the exhaust valve closing 190 occurs prior to the intake valve opening 192, e.g., during the low operating range HCCI operation 194. PVO exists when the intake valve opening 192 occurs prior to the exhaust valve closing 190, e.g., during the intermediate operating range HCCI operation 196 and the high operating range HCCI operation 198. As each specific engine has its own exhaust valve closing 190 and intake valve opening 192 characteristics, the specific closing and opening points are not important however, the trend of engine operation each graph shows is representative of operational characteristics. Low operating range HCCI operation 194 occurs and as the load increases, NVO decreases. PVO generally increases during the intermediate operating range HCCI operation 196 as the intake valve opening 192 remains relatively consistent in time and the exhaust valve closing 190 becomes later. The high operating range HCCI operation 198 occurs with PVO that is generally largest at the beginning of the high operating range HCCI operation 198 and decreases as the load increases.

The engine begins operating in the low operating range HCCI operation 194. The control module monitors the engine operating parameters to determine the current engine operating states, such as load ranges, rpm level, and combustion noise level. A torque request from the operator can increase or decrease the load requirement for the engine.

In an exemplary transition from a low load through increasing load values, the operating range of the engine is monitored. The control module determines the operating range of the low operating range HCCI operation 194 has been exceeded, e.g., the load range exceeds a first threshold load, and commands the VCP/VLC system to operate in the intermediate operating range HCCI operation 196. The intake valve begins operation in the high-lift profile, modifying both the lift and duration over the low-lift profile. The exhaust valve closing 190 may also be adjusted by the VCP/VLC system for optimum combustion. The intermediate operating range HCCI operation 196 operates with a small amount of PVO. The shift to the intermediate operating range HCCI operation 196 results in operation in PVO, decrease of RI, and decrease in NSFC over further operation in the low-lift profile 194. As the load increases, the control module increases the amount of PVO and the RI and NSFC continue to decrease. It is understood that although PVO operation is described with respect to the intermediate operating range, the controller is capable of selecting a valve overlap condition based on engine speed, engine load, and cam lobe profiles.

The control module determines the operating range of the intermediate operating range HCCI operation 196 has been exceeded, e.g., the load range exceeds a second threshold load, and commands the VCP/VLC system to operate in the high operating range HCCI operation 198. The exhaust valve is transitioned to operation in the high-lift profile, modifying both the lift and duration over the low-lift profile. The intake valve opening 192 may also be adjusted by the VCP portion of the VCP/VLC system for optimum combustion. The high operating range HCCI operation 198 operates with a larger amount of PVO than the intermediate operating range HCCI operation 196.

The control module determines the operating range of the high operating range HCCI operation 198 has exceeded predetermined a maximum for the high operating range, e.g., load exceeding a high operating range threshold load, and commands the VCP/VLC system to operate in higher operating range representing operation in SI combustion. Transition from high operating range operation with intake and exhaust valves at the high-lift profiles to SI operation with the intake and exhaust valves at the high-lift profiles results in a relatively smooth transition between the operating strategies.

The above methods are set forth in terms of a high-lift profile and a low-lift profile for an exemplary two step valve lift control. However, it will be appreciated that the methods can be used with other configurations of VLC according to modifications apparent to one having skill in the art and need not be limited to a two step configuration.

Figure 6:
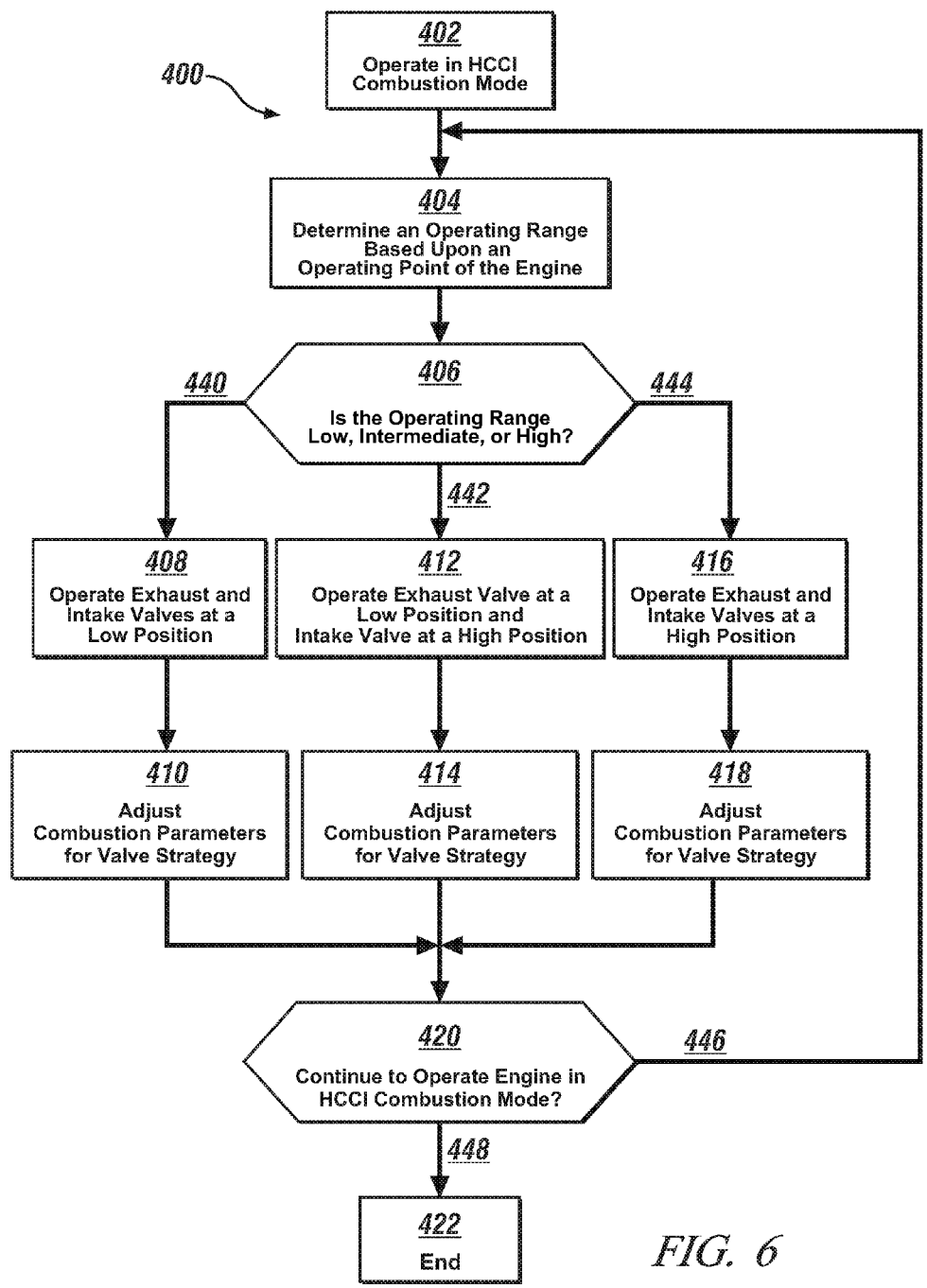
FIG. 6 illustrates a process whereby an operating range can be determined and used to control valve lift settings while operating in HCCI combustion, in accordance with the present disclosure.

FIG. 6 illustrates a non-limiting, exemplary process whereby an operating range can be determined and used to control valve lift profiles while operating in HCCI combustion. Table 1 is provided as a key to FIG. 6 wherein the numerically labeled blocks and the corresponding functions are set forth as follows.

TABLE 1

| Block | Description |
|---|---|
| 402 | Operate in HCCI Combustion Mode |
| 404 | Determine an Operating Range Based Upon an Operating Point of the Engine |
| 406 | Is the Operating Range Low, Intermediate, or High? |
| 408 | Operate Exhaust and Intake Valves at a Low Position |
| 410 | Adjust Combustion Parameters for Valve Strategy |
| 412 | Operate Exhaust Valve at a Low Position and Intake Valve at a High Position |
| 414 | Adjust Combustion Parameters for Valve Strategy |
| 416 | Operate Exhaust and Intake Valves at a High Position |
| 418 | Adjust Combustion Parameters for Valve Strategy |
| 420 | Continue to Operate Engine in HCCI Combustion Mode? |
| 422 | End |

Process 400 begins at block 402 by operating the engine in an HCCI combustion mode. At block 404, an operating range of the engine is determined based upon an operating point of the engine. At block 406, the operating range is used to select one of arrows 440 for a low operating range, 442 for an intermediate operating range, and 444 for a high operating range. At block 408, both the exhaust and intake valves are set to a low position, and at block 410, corresponding combustion parameters such as air, EGR and fuel are set. At block 412, the exhaust valve is set to a low position and the intake valve is set to a high position, and at block 414, corresponding combustion parameters such as air, EGR and fuel are set. At block 416, both the exhaust and intake valves are set to a high position, and at block 418, corresponding combustion parameters such as air, EGR and fuel are set. At block 420, if the engine is continuing to operate in HCCI mode, arrow 446 is selected and returns the process to block 404. If the engine is not continuing to operate in HCCI mode, arrow 446 is selected. Block 422 ends the process.

The disclosure discloses a single cam profile that permits the operation as described. However, several other cam profiles can be used in a like manner that may extend one or more of the operating ranges or may modify the valve lift, e.g., the intermediate operating range can be operated in NVO during part or the entire operation of the intermediate operating range, without diverging from the scope of this disclosure. It will be recognized that although a load is disclosed as a value to determine the operating range of the engine, other metrics may also be used, e.g., engine speed combined with engine load or other values determinative of engine operating point, without varying from the scope of the invention. Further, the load operating range may be predetermined based upon the operational load range of the specific engine configuration, e.g., cam profiles and operating ranges, and may also be determined by a series of look-up tables.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method to control an internal combustion engine, comprising:
   operating the engine in a homogenous charge compression ignition mode;
   determining an engine load;
   defining a plurality of operating ranges within the homogenous charge compression ignition mode, including:
      a high operating range corresponding to a high-lift valve strategy;
      an intermediate operating range corresponding to a mixed-lift valve strategy; and
      a low operating range corresponding to a low-lift valve strategy;
   comparing the engine load to a first predetermined load defining an upper limit of the low operating range;
   comparing the engine load to a second predetermined load defining an upper limit of the intermediate operating range;
   determining which one of the defined high operating range, the defined low operating range and the defined intermediate operating range the engine is operating within based upon the comparisons; and
      when the engine is determined to be operating within the low operating range, controlling the engine to operate in the homogeneous charge compression ignition mode with the low-lift valve strategy, comprising:
         a low-lift profile for an exhaust valve,
         a low-lift profile for an intake valve, and
         negative overlap of the intake and exhaust valves;
      when the engine is determined to be operating within the high operating range, controlling the engine to operate in the homogeneous charge compression ignition mode with the high-lift valve strategy, comprising:
         a high-lift profile for the exhaust valve,
         a high-lift profile for the intake valve, and
         positive overlap of the intake and exhaust valves; and
      when the engine is determined to be operating within the intermediate operating range between said low operating range and said high operating range, controlling the engine to operate in the homogeneous charge compression ignition mode with the mixed-lift valve strategy, comprising:
         the low-lift profile for the exhaust valve, and
         the high-lift profile for the intake valve.

2. The method of claim 1, further comprising:
   comparing the engine load to a third predetermined load defining an upper limit of the high operating range;
   when the engine load exceeds the upper limit of the high operating range, controlling the engine in a spark ignition mode with the high-lift valve strategy.

3. The method of claim 1, wherein each of said low, high and intermediate operating ranges is defined by a respective engine speed and a respective engine load operating point.

4. The method of claim 1, further comprising:
   determining an engine speed;
   wherein said first and second predetermined loads are determined as a function of said engine speed.

5. The method of claim 1, wherein the mixed-lift valve strategy further comprises negative valve overlap of the intake and exhaust valves.

6. The method of claim 1, wherein the mixed-lift valve strategy further comprises positive valve overlap of the intake and exhaust valves.

7. The method of claim 1, further comprising:
   determining an engine speed;
   wherein the mixed-lift valve strategy further comprises one of positive valve overlap of the intake and exhaust valves and negative valve overlap of the intake and exhaust valves based on said engine speed and said engine load.

8. A method to control an internal combustion engine, comprising:
   operating the engine in a homogenous charge compression ignition mode;
   determining an engine load;

determining an engine speed;
defining a plurality of operating ranges within the homogenous charge compression ignition mode, including:
  a high operating range corresponding to a high-lift valve strategy;
  an intermediate operating range corresponding to a mixed-lift valve strategy; and
  a low operating range corresponding to a low-lift valve strategy;
comparing the engine load and engine speed to a first predetermined load defining an upper limit of the low operating range;
comparing the engine load and engine speed to a second predetermined load defining an upper limit of the intermediate operating range;
determining which one of the defined high operating range, the defined low operating range and the defined intermediate operating ranges the engine is operating within based upon the comparisons; and
  when the engine is operating within the low operating range, controlling the engine to operate in the homogeneous charge compression ignition mode with the low-lift valve strategy, comprising:
    a low-lift profile for an exhaust valve,
    a low-lift profile for an intake valve, and
    negative overlap of the intake and exhaust valves;
  when the engine is operating within the high operating range, controlling the engine to operate in the homogeneous charge compression ignition mode with the high-lift valve strategy, comprising:
    a high-lift profile for the exhaust valve,
    a high-lift profile for the intake valve, and
    positive overlap of the intake and exhaust valves; and
  when the engine is operating within the intermediate operating range, controlling the engine to operate in the homogeneous charge compression ignition mode with the mixed-lift valve strategy, comprising:
    the low-lift profile for the exhaust valve, and
    the high-lift profile for the intake valve.

9. The method of claim 8, further comprising:
comparing the engine load to a third predetermined load defining an upper limit of the high operating range;
when the engine load exceeds the upper limit of the high operating range, controlling the engine in a spark ignition mode with the high-lift valve strategy.

10. The method of claim 8, wherein the mixed-lift valve strategy further comprises negative valve overlap of the intake and exhaust valves.

11. The method of claim 8, wherein the mixed-lift valve strategy further comprises positive valve overlap of the intake and exhaust valves.

12. The method of claim 8, wherein the mixed-lift valve strategy further comprises one of positive valve overlap and negative valve overlap selected based on said engine speed and said engine load.

13. An internal combustion engine, comprising:
a variable lift exhaust valve selectively operable with a high-lift exhaust valve profile and a low-lift exhaust valve profile;
a variable lift intake valve selectively operable with a high-lift intake valve profile and a low-lift intake valve profile; and
a control module configured to:
  control the engine to operate in a homogeneous charge compression ignition mode;
  determine an engine load;
  compare the engine load to a first predetermined load defining an upper limit of a low operating range;
  compare the engine load to a second predetermined load defining an upper limit of an intermediate operating range; and
  determine which one of a high operating range and said low and intermediate operating ranges the engine is operating within based upon the comparisons;
  control the engine to operate in the homogeneous charge compression ignition mode with a low-lift valve strategy when the engine is operating within the low operating range, the low-lift valve strategy including:
    the low-lift profile for an exhaust valve,
    the low-lift profile for an intake valve, and
    negative overlap of the intake and exhaust valves;
  control the engine to operate in the homogeneous charge compression ignition mode with a high-lift valve strategy when the engine is operating within the high operating range, the high-lift valve strategy including:
    the high-lift profile for the exhaust valve,
    the high-lift profile for the intake valve, and
    positive overlap of the intake and exhaust valves; and
  control the engine to operate in the homogeneous charge compression ignition mode with a mixed-lift valve strategy when the engine is operating within the intermediate operating range, the mixed-lift valve strategy including:
    the low-lift profile for the exhaust valve, and
    the high-lift profile for the intake valve.

14. The internal combustion engine of claim 13, wherein the control module is further configured to:
determine an engine speed; and
determine which one of said low, high and intermediate operating ranges the engine is operating within based upon said engine load and engine speed.

15. The internal combustion engine of claim 13, wherein said control module is further configured to:
control the engine in a spark ignition mode with the high-lift valve strategy when the engine is operating beyond the high operating range.

16. The internal combustion engine of claim 13, wherein the mixed-lift valve strategy further comprises negative valve overlap of the intake and exhaust valves.

17. The internal combustion engine of claim 13, wherein the mixed-lift valve strategy further comprises positive valve overlap of the intake and exhaust valves.

18. The internal combustion engine of claim 13, wherein:
the control module is further configured to determine an engine speed; and
the mixed-lift valve strategy further comprises one of positive valve overlap and negative valve overlap selected based on said engine speed and said engine load.

* * * * *